US012811491B2

(12) United States Patent
Lazaro

(10) Patent No.: US 12,811,491 B2
(45) Date of Patent: Nov. 24, 2026

(54) VOLTAGE STRESS MITIGATION IN THREE-LEVEL POWER SUPPLY

(71) Applicant: TEXAS INSTRUMENTS INCORPORATED, Dallas, TX (US)

(72) Inventor: Orlando Lazaro, Cary, NC (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 279 days.

(21) Appl. No.: 18/306,797

(22) Filed: Apr. 25, 2023

(65) Prior Publication Data

US 2023/0353042 A1 Nov. 2, 2023

Related U.S. Application Data

(60) Provisional application No. 63/337,586, filed on May 2, 2022.

(51) Int. Cl.
*H02M 3/158* (2006.01)
*H02M 1/34* (2007.01)

(52) U.S. Cl.
CPC ........... *H02M 1/344* (2021.05); *H02M 3/158* (2013.01)

(58) Field of Classification Search
CPC .. H02M 3/158; H02M 3/1582; H02M 3/1586; H02M 3/18; H02M 3/3155; H02M 3/156; H02M 7/4833; H02M 7/4835; H02M 7/4837
See application file for complete search history.

(56) References Cited

U.S. PATENT DOCUMENTS 10,075,080 B1 * 9/2018 Scoones .................. H02M 3/07
10,468,988 B2 11/2019 Scoones et al.
2016/0043659 A1 * 2/2016 Xu ........................ H02M 1/088 363/131
2016/0268924 A1 * 9/2016 Fu ......................... H02M 7/483
2017/0194860 A1 * 7/2017 Oak ................. H03K 17/04163
2022/0393578 A1 * 12/2022 Ye ....................... H02M 1/0095

* cited by examiner

*Primary Examiner* — Nguyen Tran
(74) *Attorney, Agent, or Firm* — Charles F. Koch

(57) ABSTRACT

Examples of this description include providing a first control signal having an asserted value at a first control terminal of a controllable resistive element at a first time. Examples of this description also include providing a second control signal having an asserted value at a control terminal of a high-side power transistor of a power converter subsequent to providing the first control signal, wherein the controllable resistive element snubs the high-side power transistor.

20 Claims, 7 Drawing Sheets

VOLTAGE STRESS MITIGATION IN THREE-LEVEL POWER SUPPLY

CROSS-REFERENCE TO RELATED APPLICATIONS

The present application claims priority to U.S. Provisional Patent Application No. 63/337,586, which was filed May 2, 2022, is titled "CAUX Snubber," and is hereby incorporated herein by reference in its entirety.

BACKGROUND

Various circuits, and circuit components, include parasitics, or parasitic elements. Parasitic elements are intrinsically, or in some cases inherently, occurring features that exist among, or between, circuit components such as conductive interconnects. Parasitic elements can include parasitic inductance, parasitic capacitance, parasitic resistance, among others. These parasitic elements can adversely affect operation of a circuit, such as by introducing unwanted current or voltage into the circuit.

SUMMARY

In some examples, an apparatus includes a first, second, third, and fourth transistors, and first and second controllable resistive elements. The first transistor has a first current terminal, and a first current terminal, wherein the first current terminal is coupled to a voltage supply terminal. The second transistor has a second current terminal, and a second current terminal, wherein the second current terminal is coupled to the first current terminal. The third transistor has a third current terminal, and a third current terminal, wherein the third current terminal is coupled to the second current terminal. The fourth transistor has a fourth current terminal, and a fourth current terminal, wherein the fourth current terminal is coupled to the third current terminal, and the fourth current terminal is coupled to a ground terminal. The first controllable resistive element is coupled between the second current terminal and an auxiliary voltage terminal. The second controllable resistive element is coupled between the auxiliary voltage terminal and the third current terminal.

In some examples, an apparatus includes first, second, third, and fourth transistors, first and second resistive elements, and a controller. The first transistor has a first control terminal, a first current terminal, and a first current terminal, wherein the first current terminal is coupled to a voltage supply terminal. The second transistor has a second control terminal, a second current terminal, and a second current terminal, wherein the second current terminal is coupled to the first current terminal. The third transistor has a third control terminal, a third current terminal, and a third current terminal, wherein the third current terminal is coupled to the second current terminal. The fourth transistor has a fourth control terminal, a fourth current terminal, and a fourth current terminal, wherein the fourth current terminal is coupled to the third current terminal, and the fourth current terminal is coupled to a ground terminal. The first resistive element is coupled between the second current terminal and an auxiliary voltage terminal, wherein the first resistive element has a first control terminal. The second resistive id element coupled between the auxiliary voltage terminal and the third current terminal, wherein the second resistive element has a second control terminal. The controller is coupled to the first, second, third, and fourth control terminals and the first and second control terminals. The controller is configured to provide a first control signal at the first control terminal, a second control signal at the second control terminal, and a sixth control signal at the second control terminal having an asserted value during a first period of time. The controller is also configured to provide a third control signal at the third control terminal, a fourth control signal at the fourth control terminal, and a fifth control signal at the first control terminal having a de-asserted value during the first period of time.

In some examples, a method includes providing a first control signal having an asserted value at a first control terminal of a controllable resistive element at a first time. The method also includes providing a second control signal having an asserted value at a control terminal of a high-side power transistor of a power converter subsequent to providing the first control signal, wherein the controllable resistive element snubs the high-side power transistor.

DETAILED DESCRIPTION

Figure 1:
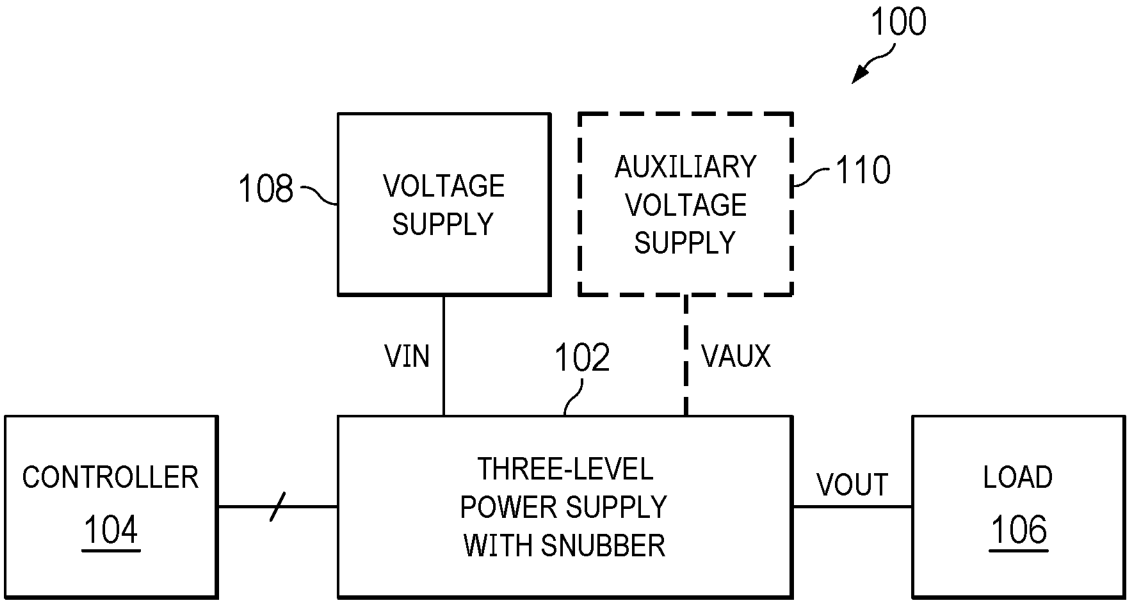
FIG. 1 is a block diagram of a system, in accordance with various examples.

As described above, parasitic elements can adversely affect operation of a circuit, such as by introducing unwanted current or voltage into the circuit. For example, a parasitic inductance between an input voltage (VIN) terminal and a power transistor of a power supply may introduce additional, unwanted current into the power supply. The additional current may cause ringing, or voltage oscillations that dissipate with time, at a switch node of the power supply. Although the ringing dissipates, depending on a strength of the parasitic inductance the ringing may create a voltage at the switch node approximately equal in value to 2*VIN. In some circumstances, this voltage can damage or degrade components of the power supply. Generally, this situation is referred to herein as voltage stress. Some approaches to mitigating voltage stress include the addition of a snubber resistor and capacitor coupled in series between the VIN terminal and a ground terminal. However, such an approach may lack controllability and increases current drawn of the power supply, rendering it unsuitable for certain application environments, such as low-power application environments.

Examples of this description provide for mitigating voltage stress through a sequence of switching of transistors of a switch-mode, or switching, power supply. In some examples, the power supply is a three-level power supply. Switching power supplies, such as buck converters, often apply two different voltages (such as ground and the input voltage) to a switching node. By using an inductor and capacitor filter coupled between the switching node and an output terminal, a direct current (DC) output voltage (VOUT) is provided at a given level at the output terminal. Using pulse width modulation (PWM), or another suitable scheme, to control the on time and off time for a high side switch coupled between the VIN terminal and the switching node, and also to control a low side switch coupled between the switching node and a ground terminal, a duty cycle for the high side switch can determine the output voltage. For a switching converter in a buck topology, the duty cycle is proportional to the ratio VOUT/VIN. In some examples, the high side and low side switches are implemented with field-effect transistors (FETs). An output inductor is coupled between the switching node and the output terminal. In a buck converter, the switching node varies between VIN and a ground potential (GND) provided at the ground terminal.

A three-level switching power supply can provide a third voltage to the switching node. In some examples, the third voltage is one-half of VIN (e.g., VIN/2), and is referred to herein as VAUX. In a three-level switching power supply, the switching node alternates between VIN and VAUX, or between VAUX and GND. Thus, for a three-level switching power supply the magnitude of voltage transitions at the switching node is approximately one-half the magnitude of the voltage transitions that occur in a traditional switching power supply. These reduced voltage transitions at the switching node reduce voltage stress on the power supply circuit elements, potentially enabling three-level switching power supplies to be implemented with smaller and lower cost components such as smaller power transistors and a smaller output inductor. However, voltage stress, as described above, can still occur.

As described above, an approach to mitigating voltage stress is the implementation of a voltage snubber having a resistance ($R_{snub}$) equal to a critical damping factor of the power supply, or $$\frac{1}{2}\sqrt{\frac{L_{est}}{C_{oss}}},$$

where $L_{est}$ is the parasitic inductance of the power supply and $C_{oss}$ is the parasitic capacitance of the power supply as seen on the switching node. A three-level switching power supply includes additional power transistors in comparison to at least some traditional switching power supplies. A size of the power transistor is proportional to a drain-to-source resistance (Rds) of the power transistor. Thus, by selecting a size of at least some of these power transistors to have Rds equal to $R_{snub}$ the power transistor may function as a voltage snubber. For example, by controlling a switching sequence of the three-level switching power supply, a power transistor functioning as a voltage snubber may be turned on prior to turning on of a high side or low side power transistor of the three-level switching power supply, thus mitigating voltage stress of components of the three-level switching power supply.

FIG. 1 is a block diagram of a system 100, in accordance with various examples. In an example, the system 100 includes a three-level switching power supply 102, a controller 104, a load 106, and a voltage supply 108. In some examples, the system 100 also includes an auxiliary voltage supply 110. Generally, the system 100 is representative of any application environment in which the three-level switching power supply 102 switches power from the voltage supply 108 to the load 106 under control of the controller 104. The controller 104 may be a processor, a microprocessor, a microcontroller, or any other combination of analog and/or digital components that are capable of providing gate control signals to the three-level switching power supply 102.

In an example, the controller 104 is coupled to the three-level switching power supply 102 and configured to provide gate control signals to power transistors (not shown) of the three-level switching power supply 102. The voltage supply 108 is coupled to the three-level switching power supply 102 and configured to provide VIN to the three-level switching power supply 102. The load is coupled to the three-level switching power supply 102 and receives VOUT from the three-level switching power supply 102 based on VIN and the control of the controller 104. In examples of the system 100 which include the auxiliary voltage supply 110, the auxiliary voltage supply 110 is coupled to the three-level switching power supply 102 and configured to provide VAUX to the three-level switching power supply 102.

As described above, in some examples, the controller 104 controls at least some of the power transistors of the three-level switching power supply 102 to function as voltage snubbers, mitigating voltage oscillations in the three-level switching power supply 102 resulting from parasitic elements present in the three-level switching power supply 102. For example, as described below, the controller controls a switching sequence of the power transistors of the three-level switching power supply 102 to cause at least some of the power transistors to operate as voltage snubbers for other of the power transistors, thereby mitigating voltage stress on components of the three-level switching power supply 102.

Figure 2:
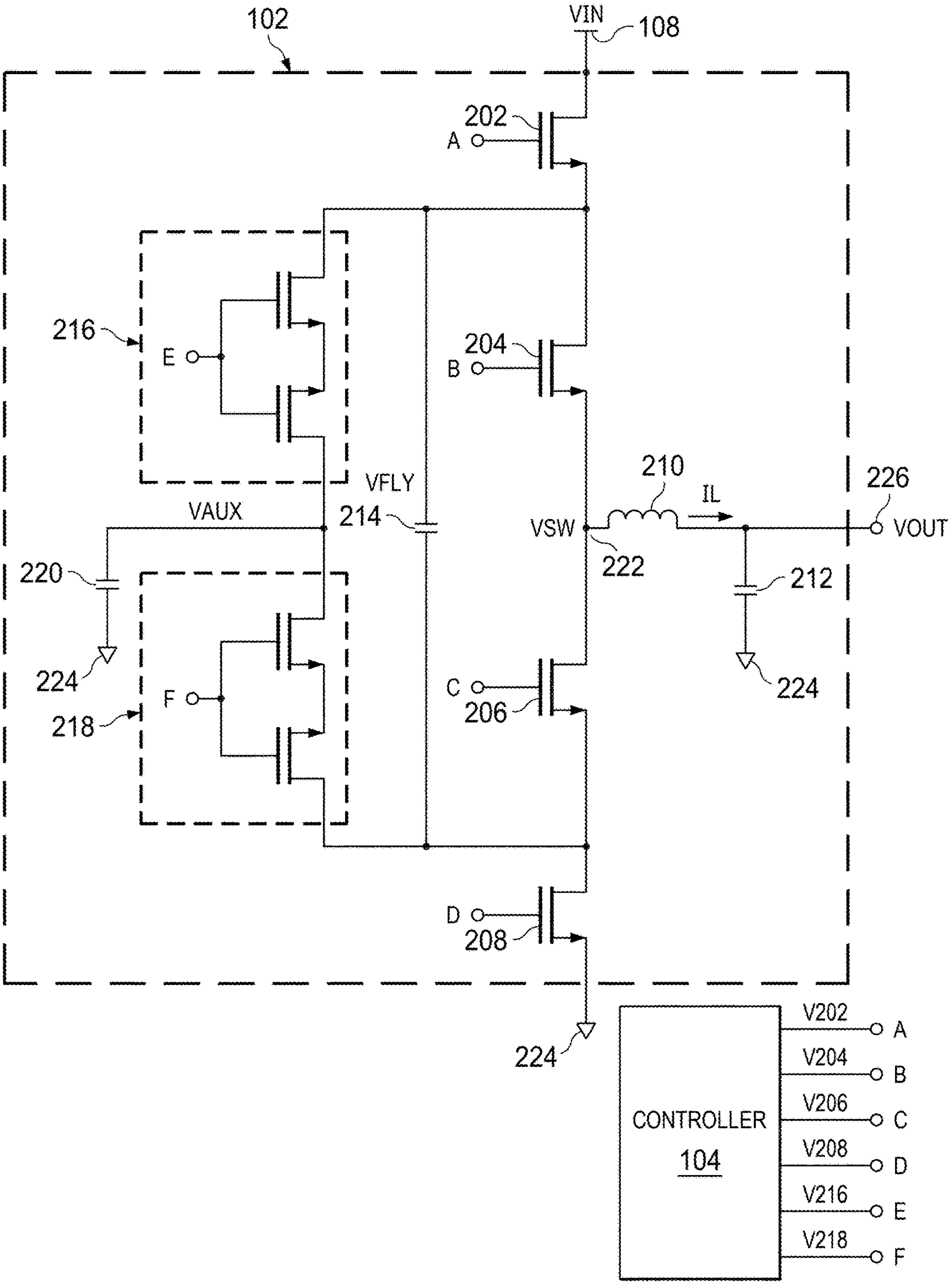
FIG. 2 is a schematic diagram of a three-level switching power supply, in accordance with various examples.

FIG. 2 is a schematic diagram of a three-level switching power supply 102, in accordance with various examples. As described above, the three-level switching power supply 102 includes a snubber. The three-level switching power supply 102 includes a transistor 202, a transistor 204, a transistor 206, a transistor 208, an inductor 210, a capacitor 212, a capacitor 214, a transistor 216, and a transistor 218. In some examples, the three-level switching power supply 102 also includes a capacitor 220. As shown in FIG. 2, the transistor 216 and the transistor 218 are each implemented as back-to-back transistor pairs having gates coupled together and having sources coupled together. However, in other examples the transistor 216 and the transistor 218 may be implemented as single transistors.

In an example architecture of the three-level switching power supply 102 the transistor 202 has a drain coupled to the voltage supply 108, a gate coupled to the controller 104, and a source. The transistor 204 has a drain coupled to the source of the transistor 202, a gate coupled to the controller 104, and a source coupled to a switch node 222 at which a switch voltage (VSW) is provided. The transistor 206 has a drain coupled to the source of transistor 204 at the switch node 222, a gate coupled to the controller 104, and a source. The transistor 208 has a drain coupled to the source of the transistor 206, a gate coupled to the controller 104, and a source coupled to a ground terminal 224. The inductor 210 has a first terminal coupled to the drain of transistor 206 and the source of transistor 204 at switch node 222 and a second terminal coupled to a VOUT terminal 226, such as to couple to the load 106 of FIG. 1. The capacitor 212 is coupled between the VOUT terminal 226 and the ground terminal 224. The capacitor 214 is coupled between the source of the transistor 202 and the drain of the transistor 208. The transistor 216 has a first drain coupled to the source of the transistor 202, a gate coupled to the controller 104, and a second drain (which may be a source in examples in which the transistor 216 is not implemented as a back to back transistor pair). The transistor 218 has a drain coupled to the second drain of the transistor 216, a gate coupled to the controller 104, and a second drain (which may be a source in examples in which the transistor 218 is not implemented as a back-to-back transistor pair) coupled to the drain of the transistor 208. Although not shown in FIG. 2, in some examples the transistors 216 and 218 that are in a common source architecture may instead be implemented in a common drain architecture. In some examples, the capacitor 220 is coupled between the second drain of the transistor 216 and the ground terminal 224. In other examples, the capacitor 220 is omitted and three-level switching power supply 102 couples to the auxiliary voltage supply 110 at a VAUX terminal coupled to the second drain of the transistor 216. Generally, the three-level switching power supply 102 receives VAUX according to any suitable process or architecture at the second drain of the transistor 216.

In an example, the capacitor 214 is a "flying capacitor" that is selectively coupled between VSW and VIN, and also selectively coupled between VSW and GND, depending on the mode of operation of the three-level switching power supply 102. Thus, the capacitor 214 "flies" from one connection arrangement to another connection arrangement during the operation of the three-level switching power supply 102. A voltage of the top plate of the capacitor 214 with respect to the bottom plate of the capacitor 214 is labeled "VFLY." VFLY is positive when the voltage of the top plate of the capacitor 214 exceeds the voltage of the bottom plate of the capacitor 214. The controller 104 controls the on and off state of the transistors 202, 204, 206, 208, 216, 218 by applying control voltages or control signals V202, V204, V206, V208, V216, and V218 to the gates of the transistors 202, 204, 206, 208, 216, 218, respectively. By switching these transistors on and off, VSW and a current through the inductor 210 (IL) are controlled to maintain VOUT at a programmed level. The inductor 210 and the capacitor 212 function as an inductor-capacitor (LC) filter circuit to reduce ripple present in VOUT, resulting from the switching of the transistors.

In the example of FIG. 2, the three-level switching power supply 102 is implemented such that VOUT is less than VIN (e.g., operates in a buck mode). However, in other examples, not shown in FIG. 2, the three-level switching power supply 102 can be rearranged to operate in a boost mode in which the polarity of current flowing through the inductor 210 is allowed to reverse, power is provided at the VOUT terminal 226 and the voltage supply 108 is replaced with a load. The three-level switching power supply 102 may operate in multiple operating modes-a "high voltage" mode and a "low voltage" mode. In the "high voltage" mode, the three-level switching power supply 102 provides VOUT having a value greater than VAUX. In the "low voltage" mode, the three-level switching power supply 102 provides VOUT having a value less than VAUX.

In FIG. 2, transistors 202, 204, 206, 208, 216, 218 are used as switches. The term "on" as used herein in reference to a transistor refers to a transistor in the Ohmic region of operation, conducting current in a forward direction with little resistance between the source and drain. The term "off" as used herein in reference to a transistor refers to a transistor in a state such that there is approximately no forward current conduction between the drain and source. Although the transistors illustrated in FIG. 2 are shown as FETs, the three-level switching power supply 102 may be implemented with other types of transistors that provide functionality similar to that described herein.

In an example of operation of the three-level switching power supply 102, the three-level switching power supply 102 initially powers up to a state in which VFLY is approximately equal to VAUX (e.g., approximately VIN/2, as shown in FIG. 2).

When a power up operation is complete, the three-level switching power supply 102 repeatedly cycles through four states. These states are described herein as the "first," "second," "third," and "fourth" states for clarity. In a cycle of operation, the three-level switching power supply 102 begins in the first state, and the remaining states occur in the following sequence: second state, third state, fourth state. The three-level switching power supply 102 then transitions from the fourth state to the first state, and the cycle of operation continues (e.g., repeats).

The four states for the three-level switching power supply 102 operating in the low voltage mode are now described. As the three-level switching power supply 102 cycles through the four states, VSW alternatively transitions between VAUX and GND. In the first state, the controller 104 provides control signals V202, V204, V206, and V208 such that the transistors 202 and 206 are on and the transistors 204 and 208 are off. In the first state, a conductive path exists through transistor 202 between the top plate of the capacitor 214 and the voltage supply 108. Also in the first state a conductive path exists through transistor 206 between the bottom plate of the capacitor 214 and the switch node 222. In the first state VSW is approximately equal to VIN-VFLY. As described above herein, VFLY is equal to VAUX, or approximately VIN/2. Thus VSW in the first state is also approximately equal to VIN/2. In this first state, the charge on the capacitor 214 increases.

In the second and fourth states, the controller 104 provides control signals V202, V204, V206, and V208 such that transistors 206 and 208 are on, and transistors 202 and 204 are off. In the second and fourth states, a conductive path exists between the switch node 222 and the ground terminal 224 through the transistors 206, 208. Thus VSW is approximately equal to GND in these two states. In the third state, the controller 104 provides control signals V202, V204, V206, and V208 such that transistors 204 and 208 are on, and transistors 202 and 206 are off. In the third state, a conductive path exists between the top plate of the capacitor 214 and the switch node 222 through transistor 204. Also in the third state, a conductive path exists between the bottom plate of the capacitor 214 and the ground terminal 224 through the transistor 208. In the third state, VSW is approximately equal to VFLY. Thus, VSW is approximately equal to VAUX, or approximately VIN/2. In the third state, the charge on the capacitor 214 decreases.

The four states for the three-level switching power supply 102 operating in the high voltage mode are now described. As the three-level switching power supply 102 cycles through these four states, VSW alternatively transitions between VAUX and VIN. The functionality of the first and third states of the high voltage mode are approximately equivalent to the functionality of the first and third states respectively of the low voltage mode described above, and thus are not repeated again herein. In the second and fourth states, the controller 104 provides control signals V202, V204, V206, and V208 such that transistors 202 and 204 are on, and transistors 206 and 208 are off. In the second and fourth states, a conductive path exists through transistors 202 and 204 between the switch node 222 and the voltage supply 108. Thus, in the second and fourth states VSW is approximately equal to VIN.

In both high voltage and low voltage modes of operation, VOUT is regulated by adjusting the ratio of the sum of elapsed time in the first and third states to the sum of elapsed time in the second and fourth states. Thus, VOUT is proportional to a duty cycle of the switching operations, where the duty cycle is the average of the fraction of the cycle time that transistor 202 is on and the fraction of the cycle time that transistor 204 is on.

In an example, the capacitor 220 and the capacitor 214 form a switched capacitor voltage divider to regulate VFLY, switched by the transistor 216 and transistor 218. By operating the capacitor voltage divider at the same time as the three-level switching power supply 102, VFLY can be regulated to VAUX and can be maintained at VAUX voltage over each cycle.

In some examples, a switching sequence of the transistors 202, 204, 206, 208, 216, and 218 can mitigate voltage oscillations at the switch node 222, damage to components of the three-level switching power supply 102, or other adverse effects resulting from parasitic elements of the three-level switching power supply 102. For example, the transistor 216 and the transistor 218 may be selected such that each respective Rds of the transistors 216 and 218 is approximately equal to $R_{snub}$. Thus, by controlling the transistor 218 to turn on momentarily before the transistor 202, and the transistor 216 to turn on momentarily before the transistor 208, voltage oscillations at the transistor 202 and the transistor 208, respectively, are snubbed, or reduced. Similarly, the transistor 216 provides snubbing for transistors 204 and 206 while the transistor 216 is turned on, and the transistor 218 provides snubbing for transistors 204 and 206 while the transistor 218 is turned on.

For example, the controller 104 provides a rising edge in V218 momentarily prior to a corresponding rising edge in V202, and provides a rising edge in V216 momentarily prior to a corresponding rising edge in V208. The rising edge in V218 causes the transistor 218 to turn on and function as a resistive element having a resistance equal to Rds of the transistor 218, snubbing the transistor 202. Similarly, the rising edge in V216 causes the transistor 216 to turn on and function as a resistive element having a resistance equal to Rds of the transistor 216, snubbing the transistor 208. In some examples, the transistor 216 and/or the transistor 218 may be replaced by switched or controllable resistive elements (or more generally, components) having a resistance approximately equal to $R_{snub}$.

In some examples, the controller 104 providing the rising edge in V218 momentarily prior to the corresponding rising edge in V202 causes a portion of current that is to be supported by the transistor 202 during commutation of the transistor 202 to be off-loaded to the transistor 218. In some examples, such off-loading further suppresses voltage oscillations at the switch node 222.

Figure 3:
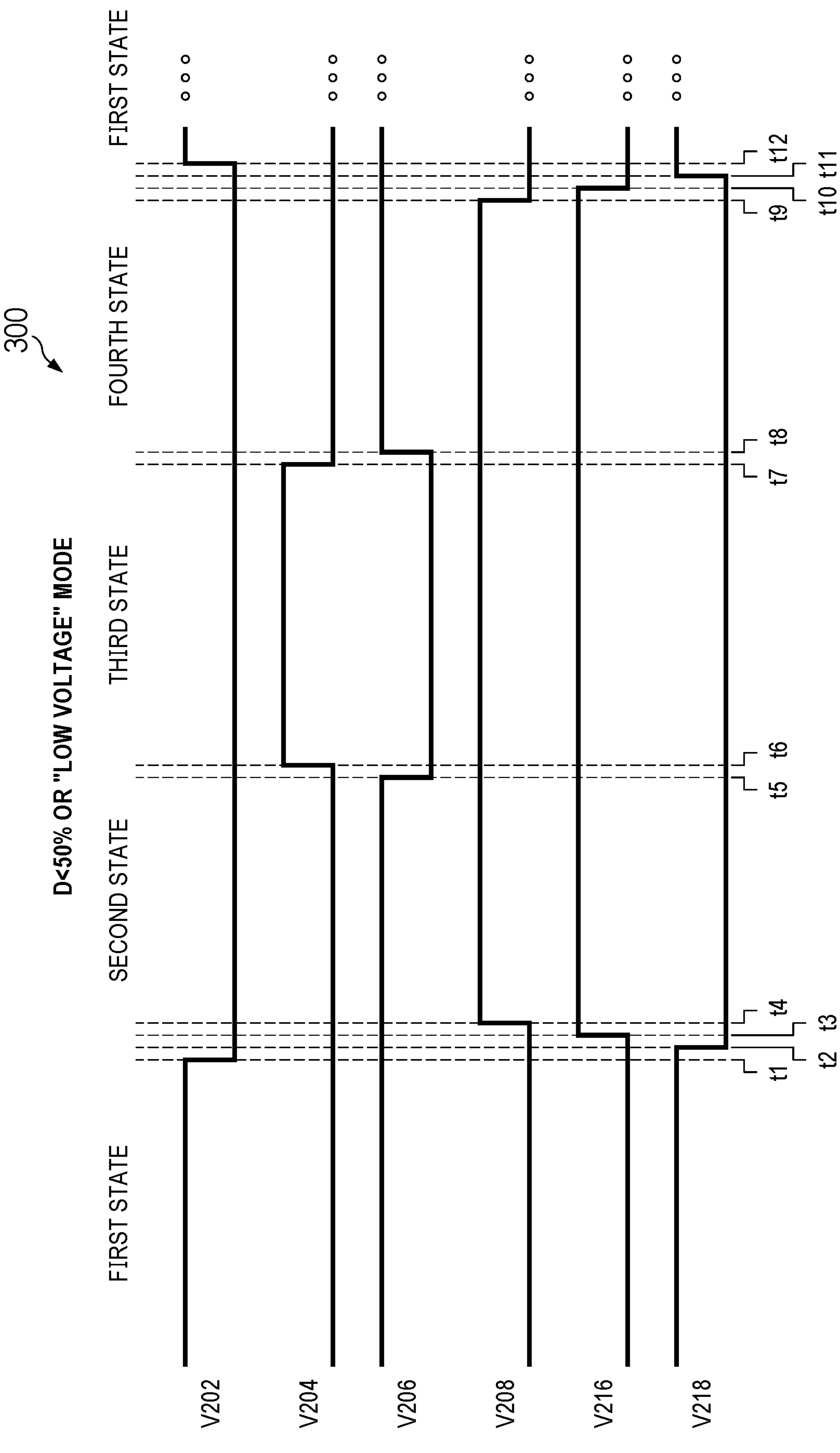
FIG. 3 is a timing diagram of control signals in a three-level switching power supply, in accordance with various examples.

FIG. 3 is a timing diagram 300 of control signals in a three-level switching power supply, in accordance with various examples. The timing diagram 300 includes V202, V204, V206, V208, V216, and V218, each as described above herein. The timing diagram 300 shows the control signals for an example in which the three-level switching power supply 102 is operating at a duty cycle of less than fifty percent. The timing diagram 300 begins in the first state of operation of the three-level switching power supply 102, as described above.

As shown in FIG. 3, at time t1, V202 is deasserted to turn off the transistor 202. Subsequently, at time t2, V218 is deasserted to turn off the transistor 218 that was snubbing the transistor 202. At time t3, V216 is asserted to turn on the transistor 216 for snubbing the transistor 208. At time t4, V208 is asserted to turn on the transistor 208. By providing V216 having an asserted value momentarily before providing V208 having an asserted value, the transistor 216 is controlled to snub the transistor 208, mitigating the effects of parasitic elements as seen at the switch node 222 resulting from the transistor 208 being turned on and conductive.

At time t5, V206 is deasserted to turn off the transistor 206, and at time t6 V204 is asserted to turn on the transistor 204. A switching period of the three-level switching power supply 102 is determined according to time between assertions of V202, or equivalently the time it takes to cycle between first, second, third, and fourth states, and may be referred to as Tsw. In some examples, assertion of V204 occurs at approximately Tsw/2 after assertion of V202. Similarly, deassertion of V206 occurs at approximately Tsw/2 after deassertion of V208.

At time t7, V204 is deasserted to turn off the transistor 204, and at time t8 V206 is asserted to turn on the transistor 206. In some examples, deassertion of V204 occurs at approximately Tsw/2 after deassertion of V202. Similarly, assertion of V206 occurs at approximately Tsw/2 after assertion of V208.

At time t9, V208 is deasserted to turn off the transistor 208. Subsequently, at time t10, V216 is deasserted to turn off the transistor 216 that was snubbing the transistor 208. At time t11, V218 is asserted to turn on the transistor 218 for snubbing the transistor 202. At time t12, V202 is asserted to turn on the transistor 202. By providing V218 having an asserted value momentarily before providing V202 having an asserted value, the transistor 218 is controlled to snub the transistor 202, mitigating the effects of parasitic elements as seen at the switch node 222 resulting from the transistor 202 being turned on and conductive.

In some examples, t1 and t2, t3 and t4, t9 and t10, and t11 and t12 are each separated by a nonzero amount of time. An amount of power consumption associated with switching of the three-level switching power supply 102 may increase as the nonzero amount of time increases, so in some application environments it may be useful to reduce the amount of time to a minimum possible. In some examples, the nonzero amount of time is in a range of (0:5] nanoseconds (ns). In other examples, the nonzero amount of time is in a range of (0:3] ns, where the decreased range correspondingly decreases power consumption associated with switching of the three-level switching power supply 102. In other examples, the nonzero amount of time is defined by relation to Tsw, where the nonzero amount of time is less than about 0.5% of Tsw, less than about 0.3% of Tsw, or about equal to or less than 0.1% of Tsw, where the decreasing percentage of Tsw decreases power consumption associated with switching of the three-level switching power supply 102.

Figure 4:
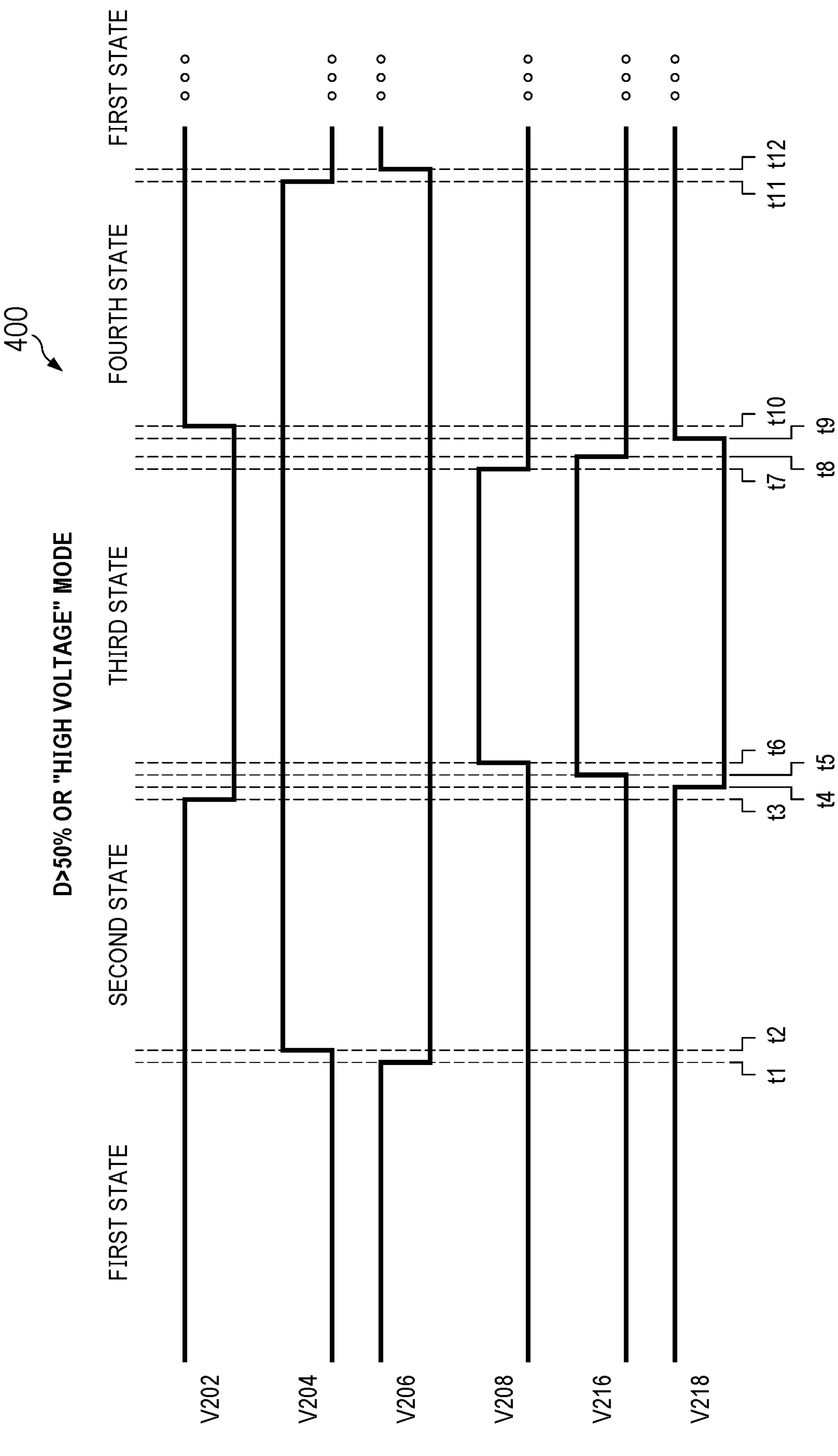
FIG. 4 is a timing diagram of control signals in a three-level switching power supply, in accordance with various examples.

FIG. 4 is a timing diagram 400 of control signals in a three-level switching power supply, in accordance with various examples. The timing diagram 400 includes V202, V204, V206, V208, V216, and V218, each as described above herein. The timing diagram 400 shows the control signals for an example in which the three-level switching power supply 102 is operating at a duty cycle of greater than or equal to fifty percent.

As shown in FIG. 4, at time t1, V206 is deasserted to turn off the transistor 206, and at time t2 V204 is asserted to turn on the transistor 204. In some examples, deassertion of V206 occurs at approximately Tsw/2 after deassertion of V208. Similarly, assertion of V204 occurs at approximately Tsw/2 after assertion of V202.

At time t3, V202 is deasserted to turn off the transistor 202. Subsequently, at time t4, V218 is deasserted to turn off the transistor 218 that was snubbing the transistor 202. At time t5, V216 is asserted to turn on the transistor 216 for snubbing the transistor 208. At time t6, V208 is asserted to turn on the transistor 208. By providing V216 having an asserted value momentarily before providing V208 having an asserted value, the transistor 216 is controlled to snub the transistor 208, mitigating the effects of parasitic elements as seen at the switch node 222 resulting from the transistor 208 being turned on and conductive.

At time t7, V208 is deasserted to turn off the transistor 208. Subsequently, at time t8, V216 is deasserted to turn off the transistor 216 that was snubbing the transistor 208. At time t9, V218 is asserted to turn on the transistor 218 for snubbing the transistor 202. At time t10, V202 is asserted to turn on the transistor 202. By providing V218 having an asserted value momentarily before providing V202 having an asserted value, the transistor 218 is controlled to snub the transistor 202, mitigating the effects of parasitic elements as seen at the switch node 222 resulting from the transistor 202 being turned on and conductive.

At time t11, V204 is deasserted to turn off the transistor 204, and at time t12 V206 is asserted to turn on the transistor 206. In some examples, deassertion of V204 occurs at approximately Tsw/2 after deassertion of V202. Similarly, assertion of V206 occurs at approximately Tsw/2 after assertion of V208.

In some examples, t3 and t4, t5 and t6, 7 and t8, and t9 and t10 are each separated by a nonzero amount of time. An amount of power consumption associated with switching of the three-level switching power supply 102 may increase as the nonzero amount of time increases, so in some application environments it may be useful to reduce the amount of time to a minimum possible. In some examples, the nonzero amount of time is in a range of (0:5] ns. In other examples, the nonzero amount of time is in a range of (0:3] ns, where the decreased range correspondingly decreases power consumption associated with switching of the three-level switching power supply 102. In other examples, the nonzero amount of time is defined by relation to Tsw, where the nonzero amount of time is less than about 0.5% of Tsw, less than about 0.3% of Tsw, or about equal to or less than 0.1% of Tsw, where the decreasing percentage of Tsw decreases power consumption associated with switching of the three-level switching power supply 102.

Figure 5:
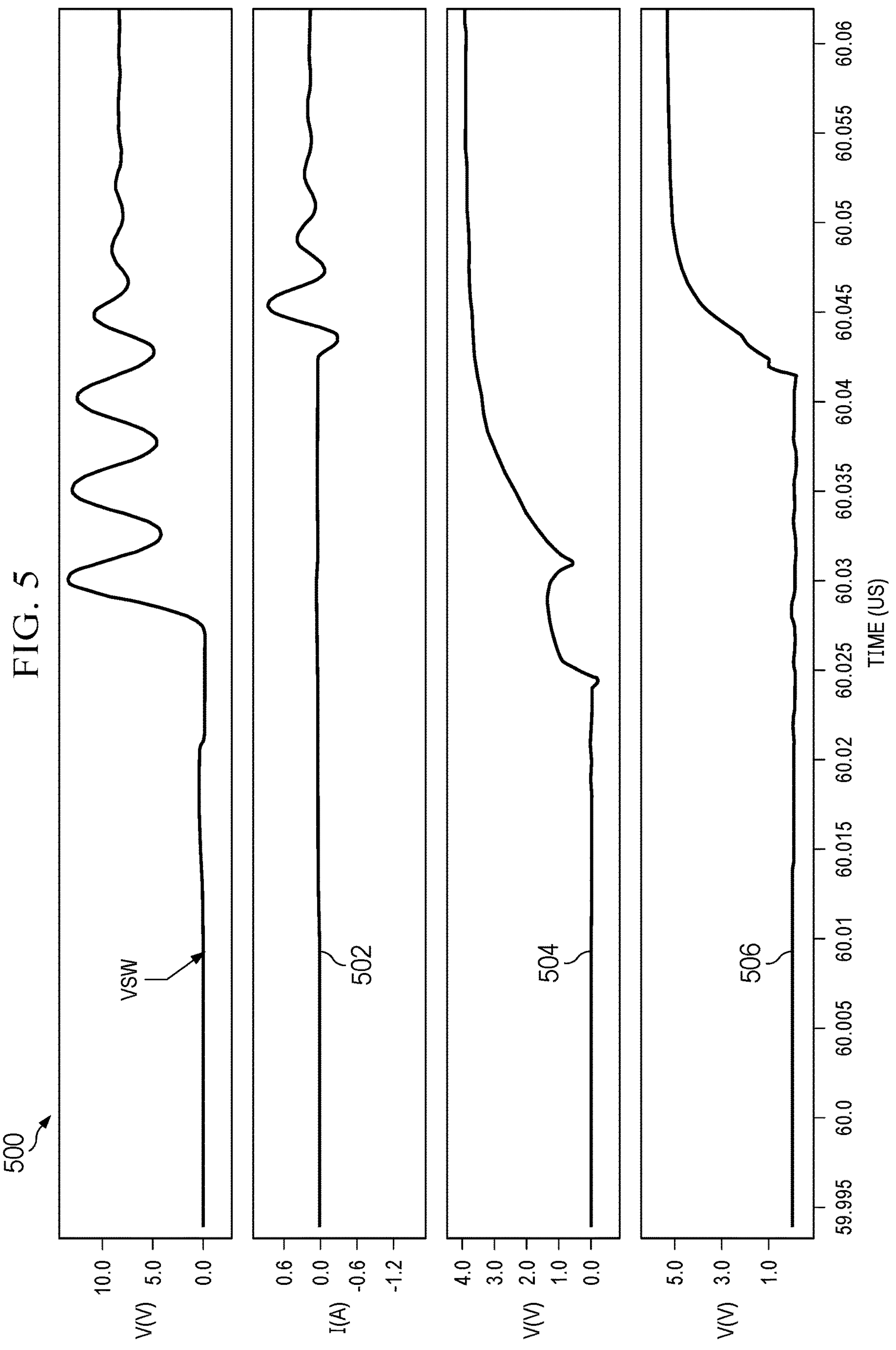
FIG. 5 is a diagram of signals, in accordance with various examples.

FIG. 5 is a diagram 500 of signals, in accordance with various examples. The diagram 500 is representative of at least some signals that may be present in the three-level switching power supply 102 without snubbing. The diagram 500 includes VSW, a signal 502 representative of a current flowing into the capacitor 220, a signal 504 representative of a gate-to-source voltage (Vgs) of the transistor 202, and a signal 506 representative of a Vgs of the transistor 218. The signals of the diagram 500 are shown having a horizontal axis representative of time in units of microseconds (us). VSW, the signal 504, and the signal 506 are shown having vertical axes representative of voltage in units of volts (V) and the signal 502 is shown having a vertical axis representative of current in units of Amperes (A).

As shown in FIG. 5, responsive to the signal 504 increasing in value to cause the transistor 202 to become conductive, VSW increases in value. However, without the transistor 218 turning on prior to the transistor 202 (e.g., as shown by the signal 506), parasitic elements of the three-level switching power supply 102 cause voltage oscillations, or ringing, in VSW such that VSW reaches a maximum peak-to-peak voltage (Vpp) of approximately 5 V before settling over time to a voltage of approximately 7.5 V. As shown by the signal 502, current flows into the capacitor 220, charging the capacitor 220, responsive to the signal 506 increasing in value, indicating that the transistor 218 is turned on.

Figure 6:
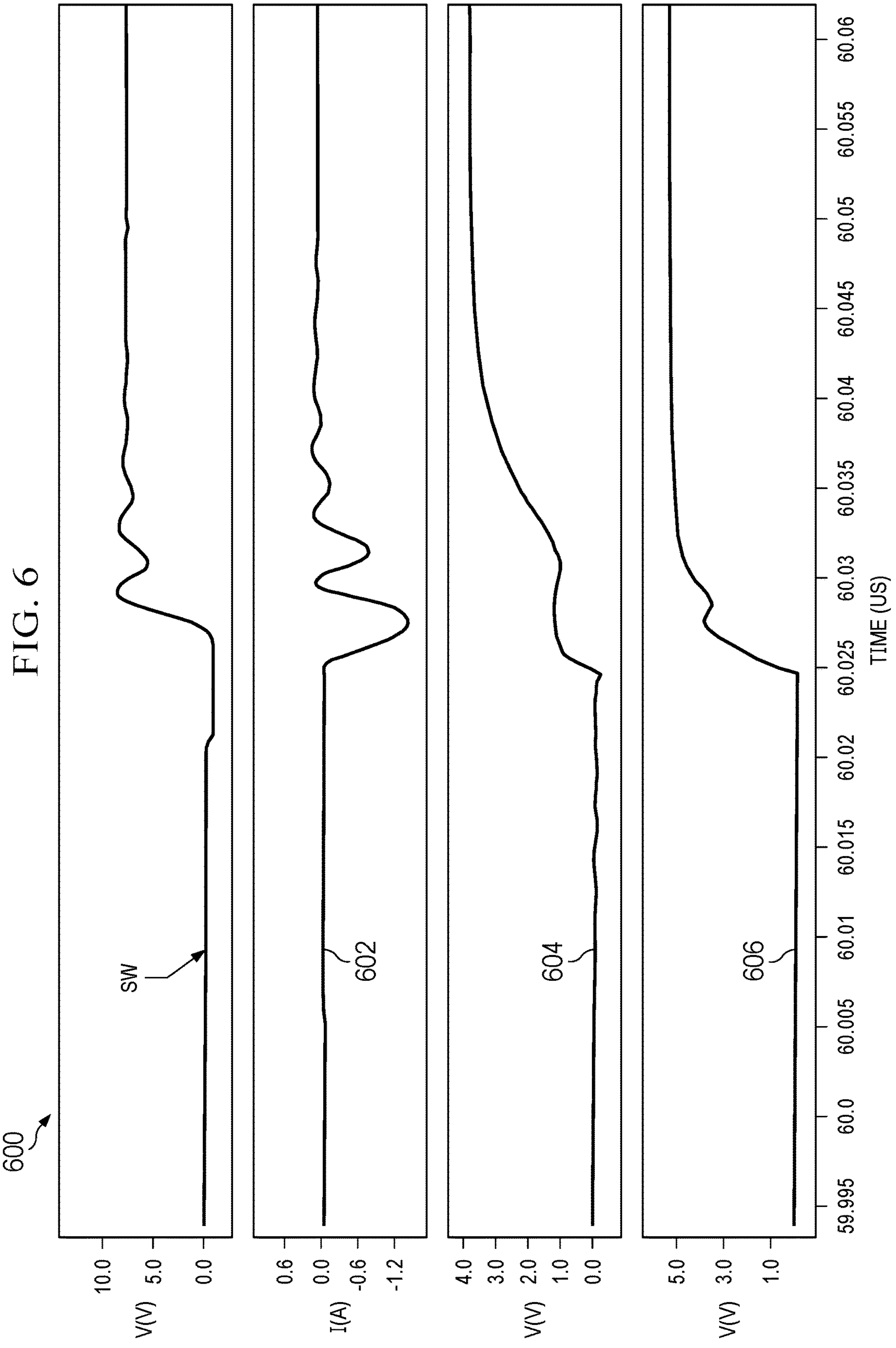
FIG. 6 is a diagram of signals, in accordance with various examples.

FIG. 6 is a diagram 600 of signals, in accordance with various examples. The diagram 600 is representative of at least some signals that may be present in the three-level switching power supply 102 with snubbing, such as provided by the transistors 216, 218. The diagram 600 includes VSW, a signal 602 representative of a current flowing into the capacitor 220, a signal 604 representative of a Vgs of the transistor 202, and a signal 606 representative of a Vgs of the transistor 218. The signals of the diagram 600 are shown having a horizontal axis representative of time in units of us. VSW, the signal 604, and the signal 606 are shown having vertical axes representative of voltage in units of V and the signal 602 is shown having a vertical axis representative of current in units of A.

As shown in FIG. 6, signal 606 increases in value to a level sufficient to cause the transistor 218 to become conductive. Subsequently, the signal 604 increases in value to a level sufficient to cause the transistor 202 to become conductive. Parasitic elements of the three-level switching power supply 102 cause voltage oscillations, or ringing, in VSW such that VSW reaches a Vpp of approximately 1.5 V, or 30% of the Vpp of FIG. 5, before settling over time to a voltage of approximately 7.5 V. By turning on the transistor 218 momentarily prior to turning on the transistor 202, Vpp of VSW is decreased, improving performance of the three-level switching power supply 102. As shown by the signal 602, current flows out from the capacitor 220, discharging the capacitor 220, responsive to the signal 606 increasing in value, indicating that the transistor 218 is turned on.

Figure 7:
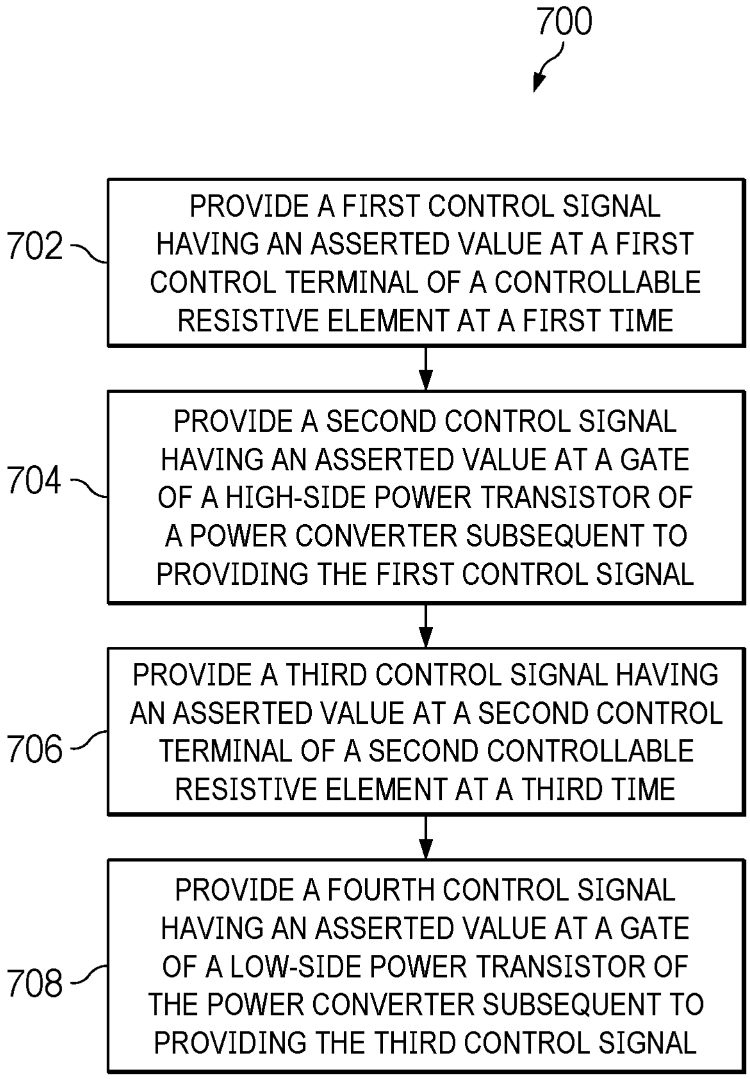
FIG. 7 is a flow diagram of a method, in accordance with various examples.

FIG. 7 is a flow diagram of a method 700, in accordance with various examples. In some examples, the method 700 is implemented in a system such as the system 100, for example, at least in part by the controller 104. The method 700 is implemented to, for example, control a sequence of switching of power transistors to cause at least some of the power transistors to function as voltage snubbers for other of the power transistors, reducing Vpp of voltage oscillations at a switch node of a power supply, such as a three-level switching power supply.

At operation 702, the controller provides a first control signal having an asserted value at a first control terminal of a controllable resistive element at a first time.

At operation 704, the controller provides a second control signal having an asserted value at a gate of a high-side power transistor of a power converter subsequent to providing the first control signal. In some examples, the controllable resistive element snubs the high-side power transistor. The controller may provide the second control signal having the asserted value subsequent to providing the first control signal having the asserted value.

At operation 706, the controller provides a third control signal having an asserted value at a second control terminal of a second controllable resistive element at a third time. In some examples, the controllable resistive element and the second controllable resistive element are FETs each having a Rds equal to a critical damping factor (e.g., $R_{snub}$) of the power converter.

At operation 708, the controller provides a fourth control signal having an asserted value at a gate of a low-side power transistor of the power converter subsequent to providing the third control signal. In some examples, the second controllable resistive element snubs the low-side power transistor. The controller may provide the fourth control signal having the asserted value subsequent to providing the third control signal having the asserted value. The second and fourth control signals are determined according to a duty cycle of the power converter and are complementary such that the high-side power transistor and the low-side power transistor are not both operating in a forward-conductive mode of operation at a same time.

Although not shown in FIG. 7, in some examples, the method 700 also includes providing a fifth control signal having an asserted value at a gate of a first transistor a programmed amount of time after providing the second control signal having the asserted value, and providing a sixth control signal having an asserted value at a gate of a second transistor the programmed amount of time after providing the fourth control signal having the asserted value, wherein the programmed amount of time is one-half of a switching period of the power converter.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A. As used herein, asserting a signal may cover providing a signal having a logical high value to a component in an active-high system implementation, or providing a signal having a logical low value to a component in an active-low system implementation. The logical high and logical low values may be digital (e.g., binary) values or analog voltages that have a magnitude sufficient to qualify as logical high or logical low in a voltage domain in which the component operates.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor. As used herein, a gate of a transistor may be referred to as a control terminal, and a source and drain of the transistor may each be referred to as current terminals. Similarly, a base of a bi-polar junction transistor (BJT) may be referred to as a control terminal, and a collector and emitter of the BJT may each be referred to as current terminals.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. An apparatus, comprising:

a first transistor having first and second terminals, the first terminal coupled to an input voltage terminal;

a second transistor having a first and second terminals, the first terminal of the second transistor coupled to the second terminal of the first transistor;

a third transistor having first and second terminals, the first terminal of the third transistor coupled to the second terminal of the second transistor;

a fourth transistor having first and second terminals, the first terminal of the fourth transistor coupled to the second terminal of the third transistor, the second terminal of the fourth transistor coupled to a ground terminal;

a first resistive element including:

a fifth transistor having first and second terminals and a control terminal, the first terminal of the fifth transistor coupled to the second terminal of the first transistor and to the first terminal of the second transistor; and a sixth transistor having first and second terminals and a control terminal, the first terminal of the sixth transistor coupled to the second terminal of the fifth transistor, the second terminal of the sixth transistor coupled to a second voltage terminal, the control terminal of the sixth transistor and the control terminal of the fifth transistor coupled together to receive a first common control signal; and a second resistive element including:

a seventh transistor having first and second terminals and a control terminal, the first terminal of the seventh transistor coupled to the second voltage terminal; and an eighth transistor having first and second terminals and a control terminal, the first terminal of the eighth transistor coupled to the second terminal of the seventh transistor, the second terminal of the eighth transistor coupled to the second terminal of the third transistor and to the first terminal of the fourth transistor, the control terminal of the seventh transistor and the control terminal of the eighth transistor coupled together to receive a second common control signal.

2. The apparatus of claim 1, further comprising a controller coupled to a control terminal of the first transistor, a control terminal of the fourth transistor, and the control terminals of the fifth, sixth, seventh, and eighth transistors, the controller capable of, when the fourth and fifth transistors are off, turning on the seventh transistor followed by turning on the first transistor.

3. The apparatus of claim 1, wherein a resistance of the first resistive element is determined according to $$\frac{1}{2}\sqrt{\frac{L}{C}},$$

in which L is a parasitic inductance of the apparatus and C is a parasitic capacitance of the apparatus.

4. The apparatus of claim 2, wherein the controller capable of, when the first and seventh transistors are off, turning on the fifth transistor followed by turning on the fourth transistor.

5. The apparatus of claim 3, wherein a resistance of the second resistive element is determined according to $$\frac{1}{2}\sqrt{\frac{L}{C}}.$$

6. The apparatus of claim 1, further comprising:

a first capacitor having first and second terminals, the first terminal of the first capacitor coupled to the second terminal of the first transistor and to the first terminal of the second transistor, the second terminal of the first capacitor coupled to the second terminal of the third transistor and to the first terminal of the fourth transistor; and a second capacitor coupled between the second voltage terminal and the ground terminal.

7. The apparatus of claim 6, further comprising:

a third capacitor coupled between an output voltage terminal and the ground terminal; and an inductor having first and second terminals, the first terminal of the inductor coupled to the second terminal of the second transistor and to the first terminal of the third transistor, the second terminal of the inductor coupled to the output voltage terminal.

8. An apparatus, comprising:

a first transistor having first and second terminals and a control terminal, the first terminal coupled to an input voltage terminal;

a second transistor having first and second terminals and a control terminal, the first terminal of the second transistor coupled to the second terminal of the first transistor;

a third transistor having first and second terminals and a control terminal, the first terminal of the third transistor coupled to the second terminal of the second transistor;

a fourth transistor having first and second terminals and a control terminal, the first terminal of the fourth transistor coupled to the second terminal of the third transistor, the second terminal of the fourth transistor coupled to a ground terminal;

a first resistive element having first and second terminals and a control terminal, the first terminal of the first resistive element coupled to the second terminal of the first transistor and to the first terminal of the second transistor, the second terminal of the first resistive element coupled to a second voltage terminal;

a second resistive element having first and second terminals and a control terminal, the first terminal of the second resistive element coupled to the second voltage terminal, the second terminal of the second resistive element coupled to the second terminal of the third transistor and to the first terminal of the fourth transistor; and a controller coupled to the control terminals of the first, second, third, and fourth transistors and to the control terminals of the first and second resistive elements, wherein, while the controller provides a first control signal having a de-asserted value to the control terminal of the first resistive element and a second control signal having the de-asserted value to the control terminal of the fourth transistor during a time period, the controller is capable of providing a third control signal having an asserted value to the control terminal of the second resistive element followed by providing a fourth control signal having the asserted value to the control terminal of the first transistor.

9. The apparatus of claim 8, wherein the time period is a first time period, and during a second a time period in which the controller provides the third control signal having the de-asserted value to the control terminal of the second resistive element and the fourth control signal having the de-asserted value to the control terminal of the first transistor, the controller is capable of providing the first control signal having the asserted value to the control terminal of the first resistive element followed by providing the second control signal having the asserted value to the control terminal of the fourth transistor.

10. The apparatus of claim 8, wherein a resistance of each of the first resistive element and the second resistive element is determined according to $$\frac{1}{2}\sqrt{\frac{L}{C}},$$

in which L is a parasitic inductance of the apparatus and C is a parasitic capacitance of the apparatus.

11. The apparatus of claim 8, further comprising a capacitor having first and second terminals, the first terminal of the capacitor coupled to the second terminal of the first transistor and to the first terminal of the second transistor, the second terminal of the capacitor coupled to the second terminal of the third transistor and to the first terminal of the fourth transistor.

12. The apparatus of claim 11, wherein the capacitor is a first capacitor, and the apparatus further comprising a second capacitor coupled between the second voltage terminal and the ground terminal.

13. The apparatus of claim 8, wherein the controller controls the first resistive element to snub a commutation of the second transistor, and controls the second resistive element to snub a commutation of the first transistor.

14. The apparatus of claim 8, wherein the first resistive element includes:
- a fifth transistor having first and second terminals and a control terminal, the first terminal of the fifth transistor coupled to the second terminal of the first transistor and to the first terminal of the second transistor; and
- a sixth transistor having first and second terminals and a control terminal, the first terminal of the sixth transistor coupled to the second terminal of the fifth transistor, the second terminal of the sixth transistor coupled to the second voltage terminal, the control terminal of the sixth transistor coupled to the control terminal of the fifth transistor, the controller coupled to the control terminals of the fifth and sixth transistors.

15. The apparatus of claim 14, wherein the second resistive element includes:
- a seventh transistor having transistor having first and second terminals and a control terminal, the first terminal of the seventh transistor coupled to the second voltage terminal; and
- an eighth transistor having first and second terminals and a control terminal, the first terminal of the eighth transistor coupled to the second terminal of the seventh transistor, the second terminal of the eighth transistor coupled to the second terminal of the third transistor and to the first terminal of the fourth transistor, the control terminal of the seventh transistor coupled to the control terminal of the eighth transistor, the controller coupled to the control terminals of the seventh and eighth transistors.

16. The apparatus of claim 12 further comprising:
- a third capacitor coupled between an output voltage terminal and the ground terminal; and
- an inductor having first and second terminals, the first terminal of the inductor coupled to the second terminal of the second transistor and to the first terminal of the third transistor, the second terminal of the inductor coupled to the output voltage terminal.

17. A method for controlling transistors of a power converter comprising a first, second, third, and fourth transistors coupled in series between an input voltage terminal and a ground terminal and further comprising a first resistive element coupled between a terminal of the first transistor and a second voltage terminal and a second resistive element coupled between the second voltage terminal and a terminal of the fourth transistor, the method comprising, during a time period starting with a first time, followed by a second time, followed by a third time, and ending with a fourth time:
- providing a first control signal to a control terminal of the fourth transistor starting at the first time, the first control signal having a de-asserted value;
- providing a second control signal to a control terminal of the first resistive element starting at the second time, the second control signal having the de-asserted value;
- providing a third control signal to a control terminal of the second resistive element starting at the third time, the third control signal having an asserted value; and
- providing a fourth control signal to a control terminal of the first transistor starting at the fourth time, the fourth control signal having the asserted value.

18. The method of claim 17, wherein the time period is a first time period, the method further comprising, during a second time period starting with a fifth time, followed by a sixth time, followed by a seventh time, and ending with an eighth time:
- providing the fourth control signal to the control terminal of the first transistor starting at the fifth time, the fourth control signal having the de-asserted value;
- providing the third control signal to the control terminal of the second resistive element starting at the sixth time, the third control signal having the de-asserted value;
- providing the second control signal to the control terminal of the first resistive element starting at the seventh time, the second control signal having the asserted value; and
- providing the first control signal to the control terminal of the fourth transistor starting at the eighth time, the first control signal having the asserted value.

19. The apparatus of claim 8, wherein the first resistive element and the second resistive element are field-effect transistors (FETs) each having a drain-to-source resistance equal to a critical damping factor of the apparatus.

20. The apparatus of claim 14, wherein the control terminal of the sixth transistor and the control terminal of the fifth transistor are coupled together to receive a common control signal.

* * * * *